United States Patent Office 3,756,839
Patented Sept. 4, 1973

3,756,839
METHOD FOR IMPROVING THE CELLULAR STRUCTURE OF RIGID LOW DENSITY SILICATE FOAMS
Ramesh P. Rao, Sarnia, Ontario, Canada, assignor to Fiberglas Canada Limited, Toronto, Ontario, Canada
No Drawing. Continuation-in-part of application Ser. No. 34,880, May 6, 1970, which is a continuation-in-part of application Ser. No. 34,882, May 5, 1970, which in turn is a continuation-in-part of application Ser. No. 875,568, Nov. 10, 1969, all now abandoned. This application June 1, 1971, Ser. No. 148,929
Claims priority, application Canada, May 5, 1971, 112,221
Int. Cl. C04b 21/02, 35/16
U.S. Cl. 106—75
9 Claims

ABSTRACT OF THE DISCLOSURE

The addition of a finely divided compatible powder to a hydrated alkali silicate composition promotes the uniform initiation of bubble formation throughout the mixture. During the foaming of the mixture, the particles of powder act as nucleation centers for the generation of foam bubbles by the water of hydration which constitutes the blowing agent. The powder may be chosen from non-reactive or only slightly reactive materials such as carbon black, silica, glass powder, glass fibers, ferric oxide ($Fe_2O_3$) metal powder and powders of organic polymers such as polyethylene and polyvinyl chloride. Alkali metal silicate foam and in particular sodium silicate foam, may be produced by the known liquid, gel or solid processes, involving the rapid input of heat energy, preferably microwave energy.

The addition of finely divided metal powder to an alkali metal silicate composition may contribute heat energy by exothermic reaction during the foaming of the silicate by input of thermal energy, and further may as a result of formation of insoluble products contribute to the insolubilization of the foam article produced thereby. In particular the use of such metal powder increases the efficiency of absorption of microwave heat energy in the foaming step.

CROSS REFERENCE TO RELATED APPLICATIONS

This application is a continuation-in-part of my copending U.S. applications S.N. 34,880 and 34,882 both filed May 5, 1970 which are themselves continuations-in-part of my application S.N. 875,568 filed Nov. 10, 1969 all of which are now abandoned.

DISCLOSURE

In my earlier applications, I disclosed a process for forming microcellular inorganic silicate foam suitable for use in building construction and having good thermal and sound insulation properties. The process of forming such foam comprises the steps of hydrating a finely divided anhydrous alkali metal silicate to contain water in an amount of 5 to 30%, and expanding the mass. The hydrated mass may be expanded by input of thermal energy, which can be provided by any conventional heat source and in particular by a microwave energy source. The alkali metal silicate may be sodium silicate and the sodium silicate may have a ratio of $SiO_2$ to $Na_2O$ in the range of 1:1 to 5:1 and even as high as 7:1. The mixture may further comprise a complexing agent to insolubilize the resulting foam.

This invention relates to an improvement in the step of foaming alkali metal silicates to produce rigid foams suitable for use as insulation, building materials and the like. Hydrated silicates may be formed by methods which have been disclosed previously. Generally these methods involve the rapid input of thermal energy into the hydrated silicates. The silicate composition will normally comprise a mixture of several ingredients formulated for best results.

It is an object of the preesnt invention to provide a method of producing structural foam products based on alkali metal silicates, and exhibiting low solubility, low density (frequently less than 10 pounds per cubic foot), and high compressive strength.

It is another object of the present invention to produce microcellular alkali metal silicate foams.

It is another object of the present invention to promote the formation of microscopic steam bubbles uniformly in the blowing of hydrated alkali metal silicate compositions to yield a foam.

It is an object of the present invention to provide a process for promoting the uniform formation of microcellular steam bubbles in the formation of high strength rigid low density microcellular foams from alkali metal silicate material comprising the steps of:

(a) Mixing finely divided substantially anhydrous solid alkali metal silicate particles, substantially all having a particle size in the range of 1 to 400 microns, and containing less than 5% water, with 0.1 to 5% of a finely divided powder having a particle size in the range of 1 to 100 microns, based on the total solids, along with water, said powder particles being insoluble or only slightly soluble under the mixing and hydrating conditions, and capable of functioning as centers for nucleation, (b) Hydrating the resulting composition by application of heat and pressure, the resulting hydrated material containing water of hydration in an amount of about 5 to 25% by weight, and a total amount of water up to 40% by weight, and compacting or coalescing the hydrated material to a mono-lithic mass;

(c) then thermally foaming the resulting compacted hydrated material by input of external energy, using said water as the blowing agent.

The finely divided powder may be chosen from the group consisting of carbon black, glass powder, glass fibers up to 1000 microns in length, asbestive fibers up to 1000 microns in length, silica, wollastonite, ferric oxide, polyethylene, polyvinyl chloride and metal. The following metals are among those which are useful: iron, zinc, magnesium, aluminum, tin, tungsten, chromium, titanium, zirconium and molybdenum and alloys thereof such as Woods metal. The powder to be employed should be one which is at least largely insoluble in water under conditions existing in the silicate composition, at least until the foaming step.

The compacting may result from heat and pressure applied during the hydrating step, or it may be effected as a separate mechanical step such as in a press, or in an extruder.

A considerable amount of research has been conducted in the organic rigid foam system to define bubble initiation and bubble growth. In some respects, the chemical or physical assimilation of the blowing agent in an inorganic ceramic or glass system could be compared to that of the organic systems, where the solvent is dissolved in the polymer. With the volatilization of the solvent the viscosity of the polymer apparently increases, giving a rigid cellular structure. As with the organics, the cell size usually decreases as the foam density increases.

In the silicate system, bubbles of vapor must be nucleated from the water of the silicate hydrate at the moment of supersaturation in order to get the highest foaming gain in volume for the amount of water present.

More highly supersaturated solutions are more readily nucleated because they are less stable than slightly supersaturated solutions. However, in highly supersaturated solutions, when only a few bubbles are nucleated, they can grow to large proportions in an almost explosive fashion and often result in a discontinuous product containing a high proportion of open cells.

In order to assist uniform micro-cell formation external nucleating agents are found to be useful. Depending on the choice of the particular nucleating agent employed, the mechanical properties of the resulting foam can be influenced. Certain nucleating agents appear to have a tendency to increase the crosslinking of the silicate during foaming and insolubilization, leading to an improvement in the mechanical properties of the resulting rigid foam. This effect appears to be particularly noticeable in respect of the use of finely divided carbon black, silica, and wollastonite (calcium silicate).

Silicate foams may be formed from the silicates of alkali metals such as lithium, sodium and potassium. Sodium silicate is preferred for use in the production of foamed silicate building materials, because of its low cost, availability, and general suitability. Potassium silicate is frequently added as well.

During the foaming step heat energy is supplied to the silicate mixture by commercially available heating means, such as a radiant heat oven, a convection oven, or a microwave oven, in order to volatilize the water of hydration and lower the viscosity of the mass, thus providing the blowing agent required for foaming. If nucleation sites are provided throughout the silicate mass this will assist the production of a uniform foam. For example, this should reduce the incidence of localized hot spots which may present a problem, particularly when microwave heating is employed.

Scanning electron microscopy has confirmed the observation that addition of such nucleating particles to the foamable compositions provides greater gas bubble dispersion and yields foams of more uniform cell size. Nucleation of dissolved vapor by bubble formation should occur more readily for higher filler loadings since there are more nucleation sites available. Similarly, the more finely divided particles should act as more efficient nucleators than the larger particles. Some nucleators may also function as insolubilization agent.

The relationship of foam density to the blowing agent concentrations and the expansion of nucleated and non-nucleated silicate foam under essentially constant cross-linking conditions were determined. Very little loss in expansion efficiency occurred for non-carbon black containing foam composites at low concentration. However, the effect of crosslinking on the foam density was definitely exhibited when titanium hypdroxide was used as an insolubilizing additive. The data showed that carbon black in the foamable composition restricts the expansion when compared to the non-nucleated foam, whereas polyethylene of −500 mesh on the U.S. standard scale aids the expansion. In the former, the nucleator is acting the same as an increase in the crosslinking, and in the latter, it is acting the same as a decrease in the degree of cross-linking. The action of carbon black is to reinforce the foam structure. Homogeneous dispersion of nucleator in the silicate hydrate matrix is required for optimum properties. The dispersion problem limits the amount of nucleator that can be used.

In addition, certain nucleation agents, for example fine polyethylene, appear to modify the rheology of the silicate hydrate in such a manner that a particularly low density foam may be achieved.

The general structure of the cell does not appear to be appreciably changed by the use of nucleation additives in the foamable compositions. The cell size distribution seems to be narrower for nucleated foams than for non-nucleated foams, due to the more efficient nucleation of the dissolved vapor. The finer particle size appears to result in the production of smaller more numerous gas bubbles.

The foam cells are very much larger than the nucleator particles. With good dispersion of the nucleator in the silicate hydrate, the cell wall should be a small membrane. Earlier workers on organic foam systems have characterized the geometry of low density foams with mathematical equations for subsequent analysis. For example, an average membrane thickness can be calculated, and the value compared to the nucleator particle size. Nucleator particles larger than cell membrane thickness may protrude adjacent cells, and perhaps cause greater permeation through the cell wall or provide point locations in the wall where physical breakdown could occur more readily. The nucleating particles used will normally be in the range of 1 to 100 microns ($\mu$) and preferably 1 to 25 microns. The size of the nucleating agent particles should be of the same order of magnitude as the thickness of the cell walls, or smaller. Thus, in the production of lower density foams, having thinner cell walls, it will be desirable to use smaller nucleating particles. The particle size of the anhydrous sodium silicate can vary widely. It may preferably be in the range of 1 to 400 microns.

When sodium silicate is the metal silicate used in the composition, the water of hydration at the time of initiation of foaming will normally be present in the amount of 5 to 25% based on the weight of the total mass of hydrated sodium silicate material. There may be additional unbound water present up to a maximum of 40% total water.

As can be expected, the density of the foam produced in accordance with the present invention will vary considerably according to the procedures employed and to the amount and particle size of the silicate hydrate powder used, as well as the amount of the water present in the silicate.

Foams produced in accordance with the present invention are found to have improved mechanical properties such as high compressive strength and low thermal conductivity. The chemical stability is found to be improved as well.

Under normal conditions of production the foam will have closed pores. However, an open cell structure can be produced if desired by incorporation of other materials such as sulphate in the mixture. In connection with the thermal foaming of silicate hydrate it is advantageous to compact the hydrated silicate to the maximum practical density before the heating in the foaming step. This can have the result of avoiding premature and uneven release of the water blowing agent, which might result from attempts to foam very loose, or loosely compacted, and inhomogeneous hydrated silicate mixtures. This will assist materially in achieving foams of uniform cell size.

The hydrated silicates will normally be foamed by rapid input of external thermal energy. Slow heating tends to dehydrate the material and results in reduced expansion efficiency, unless heating is done under saturation conditions, approaching 100% R.H.

Various techniques for expanding the silicate hydrate have been explored, as follows:

(a) Foaming in a conventional convection or radiant heat oven.—The hydrated silicate can be placed in a mold and heated at 500° C. for one hour to complete the foaming cycle. The density of the resulting foam can be controlled using either pressurized or vented molds. Drying time is primarily dependent on sample thickness and the blowing agent content. Thick samples tend to foam on the outer surfaces first, insulating the inner areas from the heat source. To ensure complete foaming and drying of an 18" x 18" x 1" foam slab, it must be left in the oven for several hours. This dwell time will increase with increasing thickness of the slab. Similar slabs can be made using the solid process where the blowing agent content is only around 20%. In this case, the density of the resulting foam may be very high (12 to 20 p.c.f.).

(b) Foaming in a microwave oven.—In general the foam density was found to be inversely proportional to the rate of heat input. The heating appears to result from molecular friction caused by the microwave electromagnetic field. The water molecules in the silicate tend to align themselves with the electric field which is rotating 180°, 2450 million times a second. Water has a dielectric constant of 76 and, having a loss tangent in the order of 0.3 may be considered as a good absorber of microwave energy.

(c) *Pressure foaming and pressure extrusion.*—The method of pressure foaming of silicate involves placing a hydrated sample in a reactor under a suitable high pressure and raising the temperature to the required level. On releasing the pressure the water of hydration is driven off and the material expands.

(d) *Spray drying.*—This technique involves spraying the polymerized liquid silicate into a hot chamber. Using a furnace heat gradient from 500 to 540° C., silicate foam microballoons were formed on spraying insolubilized O silicate as a fine mist into the chamber. Microballoons have also been prepared by expanding the fine hydrate granules in microwave and conventional ovens.

The present investigation indicates additionally that microwave foaming efficiency can be increased by as much as 30% or more by the use of finely divided metal powder. It appears that the finely divided metal acts as a dielectric material exhibiting a high loss tangent in the silicate hydrate.

In accordance with the present invention the use of metal powder which is exothermically reactive under the prevailing conditions further improves the foaming step. The heat produced by exothermic reaction of the metal powder with the silicate mixture causes the water present in the mixture to volatilize more rapidly and more uniformly thereby improving the foaming action. The mode of chemical reaction can be represented in these general terms:

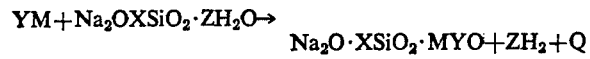

$$YM + Na_2O \cdot XSiO_2 \cdot ZH_2O \rightarrow Na_2O \cdot XSiO_2 \cdot MYO + ZH_2 + Q$$

In this reaction X, Y and Z are integers indicating mole ratios, Q is heat energy and M is one of the metals used to produce the exothermic foaming reaction.

Excessive amounts of nucleating powder will generally result in a foam of lower quality. In particular foams made with high ratios of aluminum metal powder were found to intumesce prematurely by exothermic reaction with the water in the composition, and produced a high density, porous non-uniform foamed product, or a product having a very low structural strength.

Using the present techniques, silicate foam boards and blocks may be fabricated which will be of value in insulation and in general building construction. The silicate foams may be rendered insoluble to the extent necessary by the inclusion of various insolubilization promoters, by heat curing treatment, by the application of a suitable surface coating such as an inorganic or metalloorganic surface coating composition, or by a combination of such methods. Structural units can be produced having a compressive strength of up to 400 p.s.i. (lbs. per square inch) and thermal conductivity of as low as 0.28, and a density of as low as 3 p.s.f. (lbs. per cubic foot) and very high moisture resistance (weight gain of less than 1% after one hour exposure to 5 p.s.i. stream at 227° F.).

The following examples are for the purpose of illustrating the practice of the present invention and are not considered restrictive.

In these examples, the following materials are referred to:

SS65—This is a trade name for sodium silicate anhydrous powder having a particle size of 60 to 100 mesh on the U.S. standard scale. In general, it is —65 mesh.

TBT—Trade name for tetrabutoxy titanium.

DC 190—Trademark of Dow Corning for their nonionic surfactant.

Cab-O-Sil—Trademark of Cabot Corporation, Boston, Mass., for their fluffy light anhydrous particulate colloidal silica.

Wollastonite—Trade name for a natural calcium silicate ($CaSiO_3$).

RH–730—Trademark of Reynolds Metal Company for their aluminum hydroxide $Al(OH)_3 \cdot XH_2O$ (69% $Al_2O_3$).

Igepal CO 630—Trademark of BASF for their long chain nonionic wetting agent.

FN–500—Trademark of U.S. Industries Limited for their finely divided polyethylene powder having a mesh size of —500 mesh (also known as Microethene).

CTB—Trade name for calcium tetraborate ($CaB_4O_7$).

Alon—Trademark of Cabot Corporation for their fumed, finely divided, high purity, easily dispersed alumina containing 7.1% water.

Triton—Trademark of Rohm and Haas Company for their surfactants based on alkyl aryl polyether alcohols, sulfonates, and sulfates.

EXAMPLES 1, 2 AND 3

| Compounds, percent by weight | Example 1 | Example 2 | Example 3 |
|---|---|---|---|
| Sodium silicate, anhydrous powder (—65 mesh U.S. standard) (SS–65) | 76 | 67.50 | 69.0 |
| Alumina (fumed finely divided) | Nil | Nil | 8.6 |
| Textile glass fibres (E-glass—10 by 20 microns) | Nil | 13.20 | Nil |
| Water | 23.95 | 19.20 | 22.95 |
| Surfactant | 0.05 | 0.10 | 0.45 |

A batch of each of these compositions was mixed thoroughly, hydrated with steam under moderate pressure and foamed in an oven. Heating was applied to effect the foaming reaction. The resulting slabs were trimmed and tested and found to have the following characteristics:

| Example number | 1 | 2 | 3 |
|---|---|---|---|
| Density, p.c.f. | 11.2 | 12.2 | 10.9 |
| Compressive strength at destruction (p.s.i.) | 35 | 120 | 80 |
| Percent deformation at destruction | 10.0 | 11.5 | 12 |
| Autoclave weight gain-steam-2 hours, 227° F. (percent) | 14 | 4 | 4.8 |
| Change in compressive strength after autoclave test (p.s.i.) | 5 | (¹) | (¹) |

¹ Negligible.

Sample slurries of the following composition containing carbon black (1–4 size) were autoclaved and compressed at 200 p.s.i. (100° C.) before expanding in a conventional oven at 300° C.)

EXAMPLES 4 TO 7

| Materials, percent: | Formula composition | | | |
|---|---|---|---|---|
| | 4 | 5 | 6 | 7 |
| Sodium silicate (SS–65) | 98.95 | 98.45 | 97.2 | 94.7 |
| Tetrabutoxy titanium, (DuPont TBT—trademark) | 0.1 | 0.1 | 0.1 | 0.1 |
| DC-190 Surfactant (trademark) | 0.1 | 0.1 | 0.1 | 0.1 |
| $(NH_4)_2SO_4$ | 0.1 | 0.1 | 0.1 | 0.1 |
| Carbon black | 0.75 | 1.25 | 2.5 | 5 |
| Foam density in p.c.f. | 18.1 | 18.97 | 18.52 | 21.1 |
| Compression strength, p.s.i. | 170 | 190 | 200 | 230 |

NOTE.—Each composition was mixed with 20% water and autoclaved at 227° F., 15 p.s.i.g. for 30 minutes before foaming.

EXAMPLES 8 TO 12

| Compounds, percent: | Formula composition | | | | |
|---|---|---|---|---|---|
| | 8 | 9 | 10 | 11 | 12 |
| SS–65 | 99.7 | 98.95 | 98.55 | 97.20 | 95.7 |
| "Cabosil" M-5 | 0.0 | 0.75 | 1.25 | 2.50 | 4.0 |
| Tetrabutoxy titanium | 0.1 | 0.1 | 0.1 | 0.1 | 0.1 |
| Surfactant DC-190 (trademark) | 0.1 | 0.1 | 0.1 | 0.1 | 0.1 |
| $(NH_4)_2SO_4$ | 0.1 | 0.1 | 0.1 | 0.1 | 0.1 |
| Density of foam (p.c.f.) | | 11.4 | 11.78 | | 12.30 |

COMMENTS.—Sample slurries were autoclaved for 15 minutes at 15 p.s.i. The sample blocks were then ground, and placed in an autoclave for 5 minutes at 15 p.s.i. to coalesce the particles. The samples were then foamed in a conventional oven at 500° C.

Comments: Sample slurries were autoclaved for 15 minutes at 15 p.s.i. The sample blocks were then ground, and placed in an autoclave for 5 minutes at 15 p.s.i. to coalesce the particles. The samples were then foamed in a conventional oven at 500° C.

Hydrate blocks were pressed for 1 minute at 800 p.s.i. with a plate temperature of 105–110° C. The pressed slabs were then foamed in a microwave oven.

EXAMPLES 13 TO 18

| | Formulation | | | | | |
|---|---|---|---|---|---|---|
| | 13 | 14 | 15 | 16 | 17 | 18 |
| Compounds, percent: | | | | | | |
| SS-65 (sodium silicate) | 65.3 | 65.2 | 65.1 | 64.8 | 64.3 | 63.3 |
| RH-73 (trade mark) | 3.6 | 3.6 | 3.6 | 3.6 | 3.6 | 3.6 |
| B(OH)$_3$ | 5.2 | 5.2 | 5.2 | 5.2 | 5.2 | 5.2 |
| Ti(OH)$_4$ | 0.25 | 0.25 | 0.25 | 0.25 | 0.25 | 0.25 |
| CTB | 0.9 | 0.9 | 0.9 | 0.9 | 0.9 | 0.9 |
| FN-500 (trade mark) | 1.8 | 1.8 | 1.8 | 1.8 | 1.8 | 1.8 |
| MgOCl | 0.1 | 0.1 | 0.1 | 0.1 | 0.1 | 0.1 |
| Igepal Co 630 (trademark) | 0.005 | 0.005 | 0.005 | 0.005 | 0.005 | 0.005 |
| Wollastonite (CaSiO$_3$) | 0.0 | 0.1 | 0.2 | 0.5 | 1.0 | 2.0 |
| H$_2$O | 23.1 | 23.1 | 23.1 | 23.1 | 23.1 | 23.1 |
| Density of foam, p.c.f. | 6.27 | 5.26 | 4.82 | 6.61 | 6.62 | 4.96 |
| | 5.97 | 4.52 | | 4.70 | 6.67 | 5.07 |
| | | 5.35 | | 8.77 | 7.15 | 4.94 |
| | | 5.19 | | 4.67 | 6.24 | |

NOTE.—Wollastonite (CaSiO$_3$), sample description: White powder, fine, less than 100 mesh, obtained from Cabot Carbon, Boston, Mass.
COMMENTS.—Hydrate slabs were pressed for 1 minute at 800 p.s.i. in a mold at 105–110° C. The pressed slabs were then foamed in a microwave oven.

EXAMPLES 19 to 21

A group of experiments was conducted using calcium tetraborate (CTB) as a nucleator. This material is slightly reactive with the silicate composition. The CTB was prepared by reacting calcium chloride with borax, followed by filtration. The CTB was added as a 20% solids slurry. The percentage was calculated on the basis of solid CTB in the following formulations:

EXAMPLES 19 TO 21

| Compounds | Formulations | | |
|---|---|---|---|
| | 19 | 20 | 21 |
| SS-65, grams | 334 | 329.0 | 321.0 |
| H$_3$BO$_3$, percent | 40.3 | 39.4 | 38.6 |
| RH-730 (trademark), percent | 20.4 | 29.5 | 19.3 |
| Microthene, percent | 4.0 | 3.9 | 3.8 |
| Triton X100 (trademark), percent | 0.4 | 0.4 | 0.1 |
| CaB$_4$O$_7$ (CTB), percent | 0.0 | 0.5 | 1.0 |
| H$_2$O, percent | 125.0 | 125.0 | 125.0 |
| Foam density from: | | | |
| (a) 14–25 mesh range (p.c.f.) | 6.13 | 7.22 | 9.28 |
| (b) 25 mesh (p.c.f.) | 8.25 | 10.08 | 9.95 |
| Autoclave 15 min., 5 p.s.i. percent weight gain 30 min.: | | | |
| (a) | 0.74 | 0.72 | 0.66 |
| (b) | 0.56 | 0.46 | 0.55 |
| (a) | 1.45 | 1.39 | 1.38 |
| (b) | 1.04 | 0.89 | 0.97 |

COMMENTS.—Samples were prepared by hydrating blocks of silicate. These blocks were ground and separated into the two mesh ranges. Then before microwave foaming the samples of granules were placed in an autoclave for 5 minutes at 15 p.s.i. to make particles coalesce.

The CTB appears to react with the silicate to form an insoluble calcium silicate.

EXAMPLES 22 TO 26

| | Formulation | | | | |
|---|---|---|---|---|---|
| | 22 | 23 | 24 | 25 | 26 |
| Compounds, percent: | | | | | |
| SS-65 (sodium silicate) | 65.3 | 65.2 | 65.1 | 64.8 | 64.3 |
| RH-730 (trademark) | 3.6 | 3.6 | 3.6 | 3.6 | 3.6 |
| B(OH)$_3$ | 5.2 | 5.2 | 5.2 | 5.2 | 5.2 |
| Ti(OH)$_4$ | 0.25 | 0.25 | 0.25 | 0.25 | 0.25 |
| CTB | 0.9 | 0.9 | 0.9 | 0.9 | 0.9 |
| FN-500 (trademark) | 1.8 | 1.8 | 1.8 | 1.8 | 1.8 |
| MgOCl | 0.1 | 0.1 | 0.1 | 0.1 | 0.1 |
| Igepal CO 630 | 0.005 | 0.005 | 0.005 | 0.005 | 0.005 |
| Alon (alumina) (trademark) | 0.0 | 0.1 | 0.2 | 0.5 | 1.0 |
| H$_2$O | 23.1 | 23.1 | 23.1 | 23.1 | 23.1 |
| Density of foam, p.c.f. | 6.27 | 2.96 | 3.56 | 4.94 | 8.35 |
| | 5.97 | 3.38 | 7.01 | 5.61 | 8.56 |
| | | 3.18 | 3.47 | | 9.75 |
| | | 3.28 | | | |

COMMENTS.—Very large cells were observed, particularly in the lower "Alon" percentage range. Consequently there was a very large cell size distribution in the samples.

EXAMPLES 27 TO 29

| | Example | | |
|---|---|---|---|
| Compounds, percent by weight | 27 | 28 | 29 |
| Sodium silicate (−65 mesh U.S. standard) | 76 | 77 | 72 |
| Water | 23.95 | 18.95 | 22.95 |
| Surfactant (Igepol CO-630) (trademark) | 0.05 | 0.05 | 0.05 |
| Magnesium powder (finely divided) | Nil | 4 | Nil |
| Zinc | Nil | Nil | 5 |

A batch of each of these compositions was thoroughly mixed, hydrated under steam and moderate pressure and foamed in an oven. Heating was applied to effect the foaming reaction, particularly in respect of Example 1. The exothermic reaction supplied much of the heat required from Examples 30 and 31. The resulting slabs were tested and found to have the following characteristics:

| For Example | 27 | 28 | 29 |
|---|---|---|---|
| Density (p.c.f.) | 11.2 | 10 | 7.22 |
| Compression strength at destruction (p.s.i.) | 35 | 90 | 75.7 |
| Percent compression deformation at destruction | 10 | 9.2 | 23 |

NOTE.—Compression tests as in ASTM C-165.

EXAMPLES 30 AND 31

| | Example | |
|---|---|---|
| Compounds, percent by weight | 30 | 31 |
| Sodium silicate (−65 mesh U.S. standard) | 67.7 | 67.5 |
| Al(OH)$_3$·xH$_2$O RH-730 [1] | 3.1 | |
| H$_3$BO$_3$ | 4.6 | 4.65 |
| Polyethylene powder (FN500 [1]) | 0.75 | 1.06 |
| Surfactant | 0.05 | 0.05 |
| Ti(OH)$_4$ (finely divided) | | 2.58 |
| Zn dust (−300 mesh U.S. standard) | 0.25 | 0.26 |
| H$_2$O (warm) | 23.1 | 23.9 |

[1] Trademark.

Portions of these compositions were thoroughly mixed, hydrated under steam and moderate pressure and foamed in an oven. Mild external heat was applied to initiate the reaction, but the exothermic reaction supplied sufficient heat to complete the foaming. The foam slabs were cooled and trimmed. The resulting slabs exhibited the following characteristics.

For Example 30:
    Density (p.c.f.) (average)    13
    Compression strength at destruction (p.s.i.)    147 to 149
    Percent compression deformation at destruction    5 to 11.5
    Compression load at destruction (lbs.)    3675 to 3725

(Compression tests as in ASTM C–165)

For Example 31:
    Density (p.c.f.)    5 to 7.6
    Autoclave weight gain percent (steam 15 min. at 5 p.s.i.g.)    0.2
    K value B.t.u./hr. ft.$^2$ (F.°/in.) at 75° F.    0.364
    Modulus of rupture    20.0 to 26.2
    Flexural strength p.s.i. (ASTM C–133)    20 to 26.2

EXAMPLES 32 TO 34

| Compounds percent by weight | Example 32 | Example 33 | Example 34 |
|---|---|---|---|
| Sodium silicate —65 mesh | 65.05 | 64.8 | 64.3 |
| Al(OH)$_3$.xH$_2$O RH 730 (trademark) | 3.6 | 3.6 | 3.6 |
| B(OH)$_3$ boric acid | 5.2 | 5.2 | 5.2 |
| Ti(OH)$_4$ | 0.25 | 0.25 | 0.25 |
| Calcium tetraborate | 0.9 | 0.9 | 0.9 |
| Polyethylene powder —500 mesh | 1.9 | 1.8 | 1.8 |
| MgOCl | 0.8 | 0.1 | 0.1 |
| Surfactant | 0.005 | 0.005 | 0.005 |
| Zn | 0.25 | 0.50 | 1.5 |
| H$_2$O | 23.1 | 23.1 | 23.1 |

COMMENTS.—Hydrate slabs were pressed for 1 minute at 800 p.s.i. with a 105–110° C. plate temperature. Pressed slabs were then foamed in a microwave oven. The density of foam slabs made in accordance with these examples was as follows:

Example 32: 5.01 to 6.94 p.c.f.
Example 33: 5.53 to 6.41 p.c.f.
Example 34: 7.03 to 7.61 p.c.f.

EXAMPLES 35 AND 36

| Compounds, percent by weight | Example 35 | Example 36 |
|---|---|---|
| Sodium silicate (—65 mesh) | 88.20 | 87.95 |
| Al(OH)$_3$.xH$_2$O | 4.0 | 4.0 |
| B(OH)$_3$ | 6.0 | 6.0 |
| Calcium tetraborate | 0.5 | 0.5 |
| Polyethylene powder (FN-500) (trademark) | 1.0 | 1.0 |
| Surfactant | 0.05 | 0.05 |
| Zn | 0.25 | 0.5 |
| H$_2$O | difference | difference |

COMMENTS.—Hydrate slabs were pressed for 1 minute at 800 p.s.i. with 105–110° C. plate temperature. Pressed slabs were then foamed in a microwave oven. Flexural stengths for slabs made in accordance with Example 37 were 45.6 68.0; and foam densities from 6.16 to 9.33. For Example 38 flexural strengths were 37.6 to 75.6 and densities 6.43 to 7.84.

The embodiments of the invention in which an exclusive property or privilege is claimed are defined as follows:

1. A process for promoting the uniform formation of microcellular steam bubbles in the formation of high strength rigid low density microcellular foams from alkali silicate material comprising the steps of:
   (a) mixing finely divided substantially anhydrous solid alkali metal silicate particles, substantially all having a particle size in the range of 1 to 400 microns and containing less than 5% water, with 0.1 to 5% of a finely divided powder having a particle size in the range of 1 to 100 microns, based on the total solids, along with water, said powder particles being insoluble or only slightly soluble under the mixing and hydrating conditions, and capable of functioning as centers for nucleation,
   (b) hydrating the resulting composition by application of heat and pressure, the resulting hydrated material containing water of hydration in an amount of about 5 to 25% by weight, and a total amount of water up to 40% by weight, and compacting or coalescing the hydrated material to a monolithic mass;
   (c) then thermally foaming the resulting compacted hydrated material by input of external energy, using said water as the blowing agent.

2. A method as in claim 1 wherein the alkali metal silicate is chosen from sodium and potassium.

3. A method as in claim 1 wherein the nucleation powder is chosen from carbon black, silica, glass powder, glass fibers up to 1000 microns in length, asbestine fibers up to 1000 microns in length, wollastonite, ferric oxide, polyethylene, polyvinyl chloride, and metal.

4. A method as in claim 3 wherein the powder is a metal chosen from iron, zinc, magnesium, aluminum, tin, chromium, titanium, zirconium, tungsten, molybdenum and Woods' metal.

5. A method as in claim 1 wherein a surfactant is added to the water added to the silicate mixture.

6. A method as in claim 1 wherein the source of energy is a microwave source.

7. A method as in claim 4 wherein the source of energy is a microwave source.

8. A method as in claim 1 wherein the nucleator particles have a size in the range of 1 to 25 microns.

9. The foamed silicate article produced by the method of claim 1.

References Cited
UNITED STATES PATENTS

| | | | |
|---|---|---|---|
| 3,095,312 | 6/1965 | Holmes | 106—75 |
| 3,136,645 | 6/1964 | Dess | 106—75 |
| 3,150,988 | 9/1964 | Dess et al. | 106—75 |
| 3,184,371 | 5/1965 | Seidl | 106—75 |
| 3,396,112 | 8/1968 | Burrows | 106—75 |
| 3,434,980 | 3/1969 | Stastny et al. | 106—75 |
| 3,466,221 | 9/1969 | Sams et al. | 106—75 |

JAMES E. POER, Primary Examiner

U.S. Cl. X.R.

106—110